Aug. 14, 1945.  T. DE ROODE  2,382,402
PASSENGER ACCOMODATIONS IN VEHICLES
Original Filed May 10, 1937  4 Sheets—Sheet 1
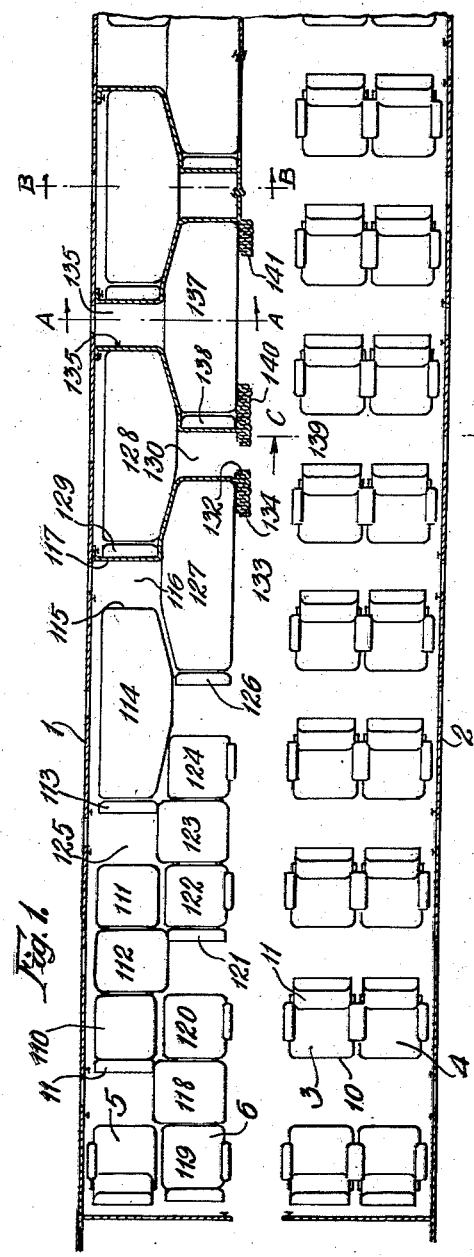
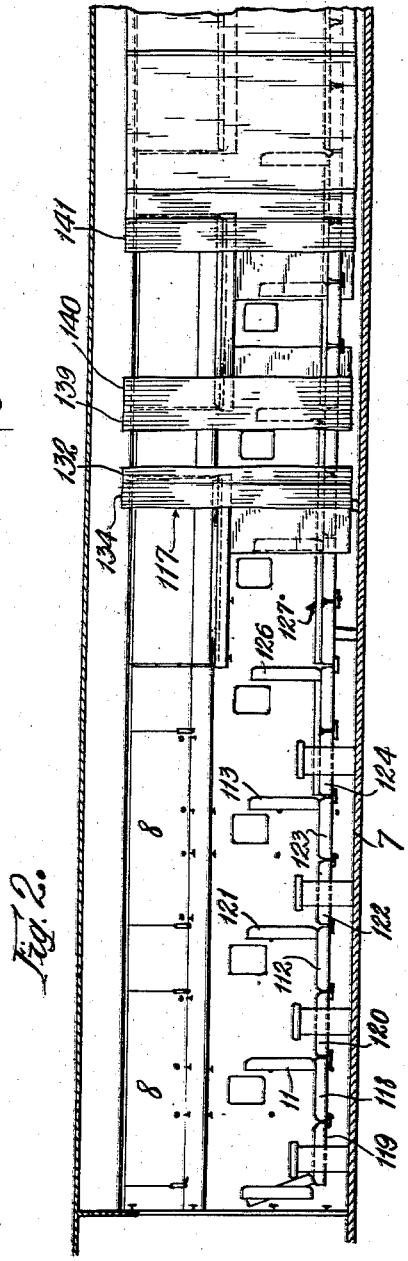
WITNESSES:
INVENTOR.
Trimble de Roode,
BY
ATTORNEY.

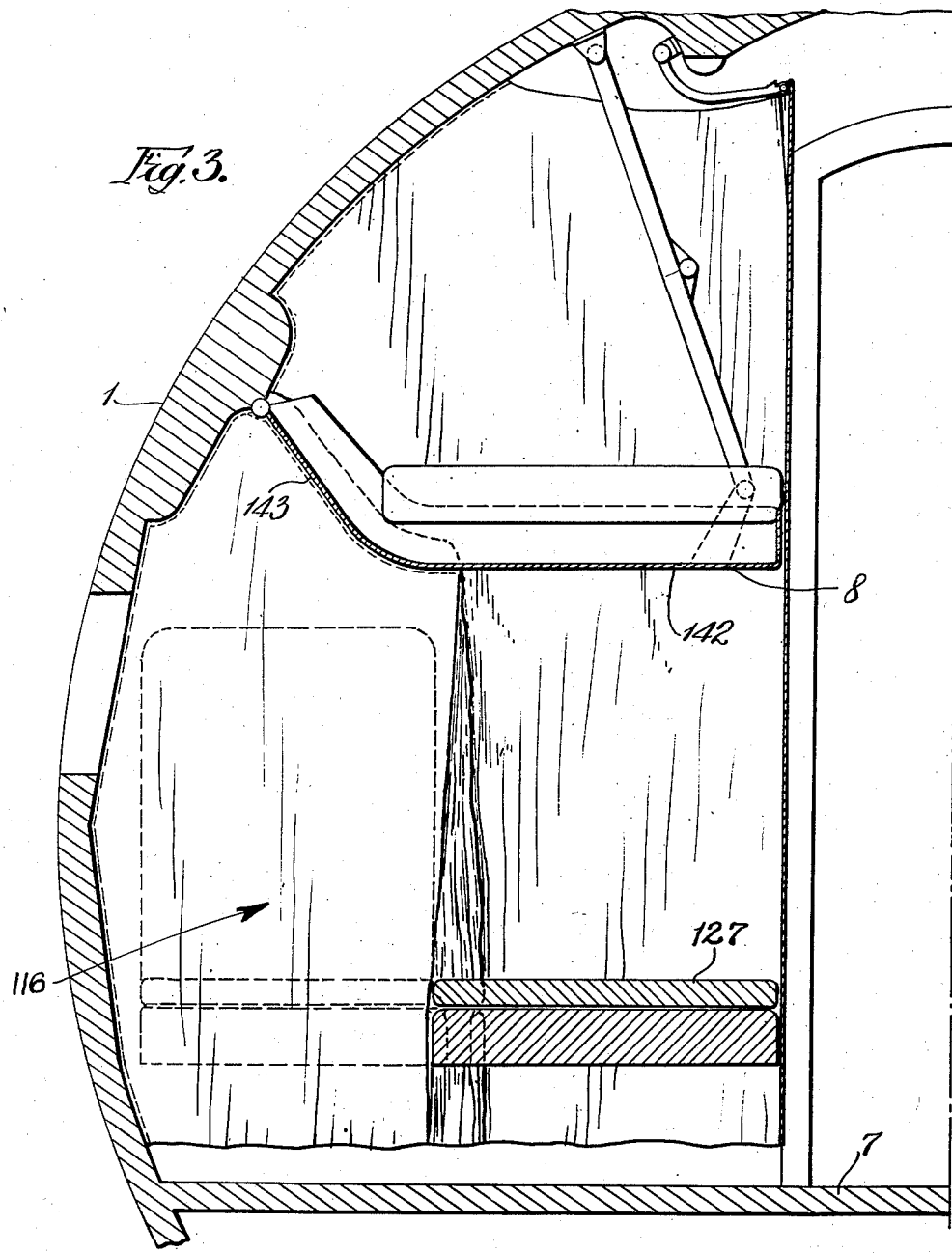

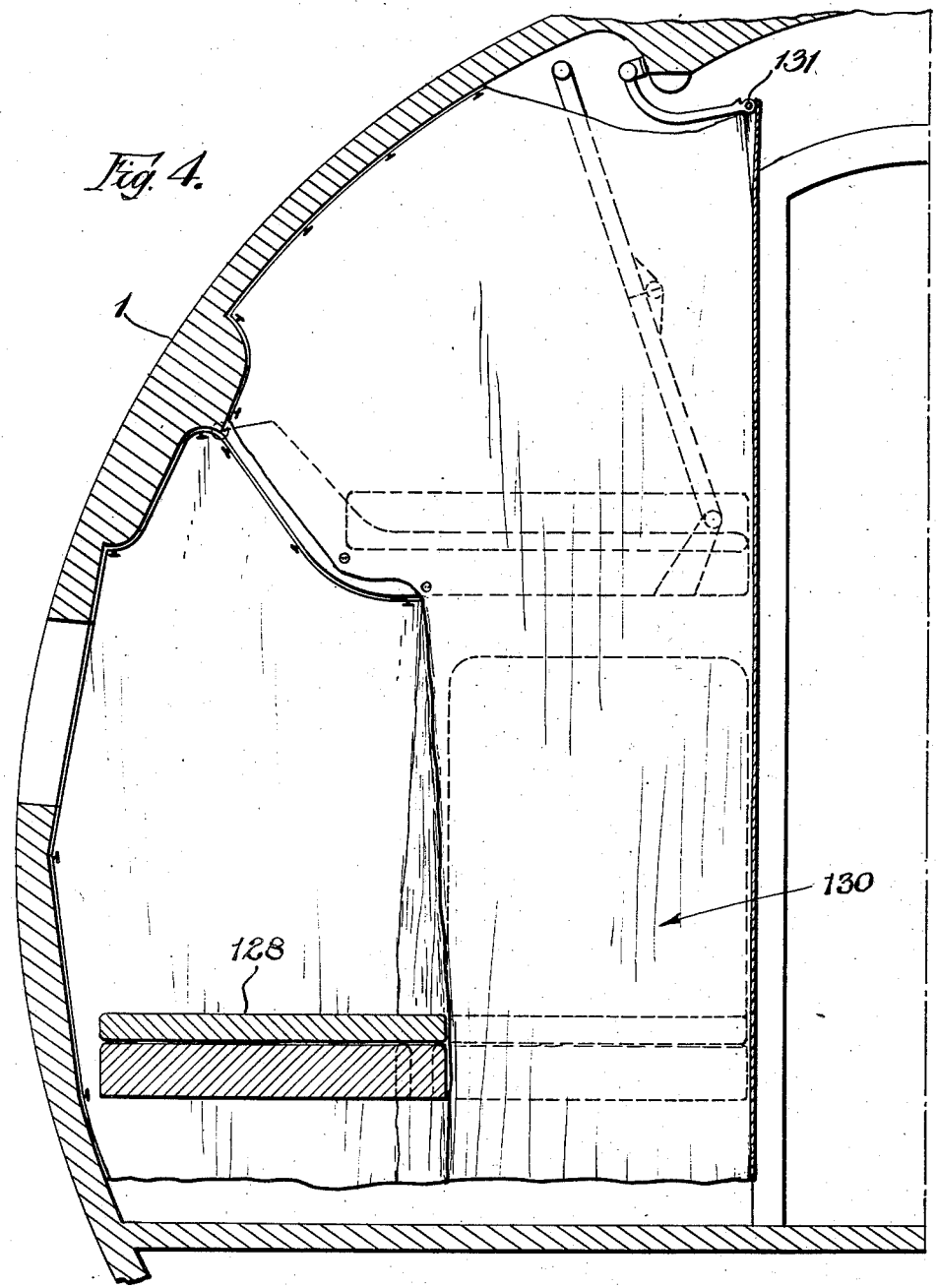

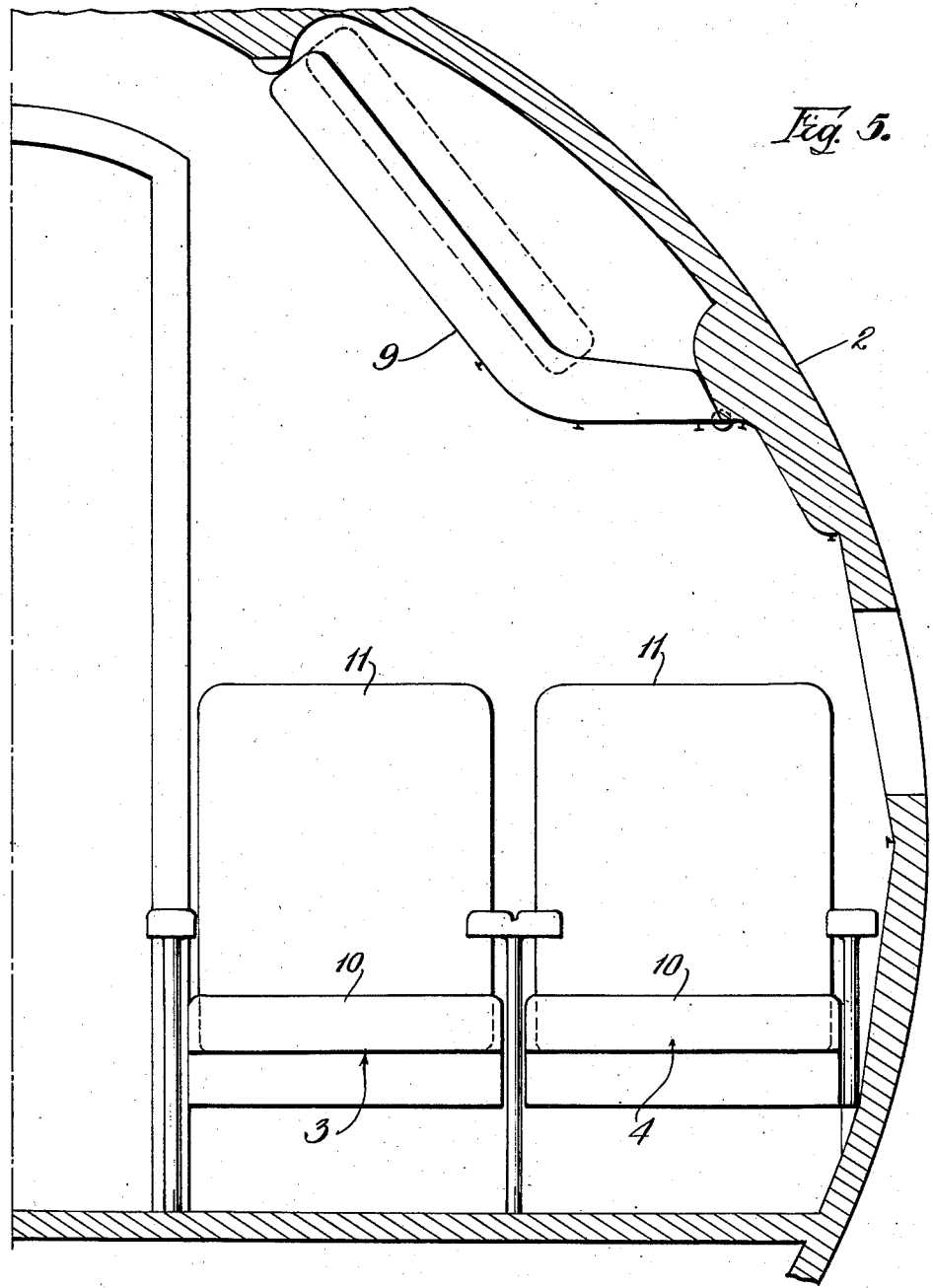

Patented Aug. 14, 1945

2,382,402

UNITED STATES PATENT OFFICE 2,382,402

PASSENGER ACCOMMODATIONS IN VEHICLES

Trimble de Roode, New York, N. Y.

Continuation of application Serial No. 141,779, May 10, 1937. This application October 16, 1943, Serial No. 506,545

25 Claims. (Cl. 244—118)

This invention relates to vehicles and the like and particularly to airplanes suitable to be converted from day passenger use to night passenger use and vice versa. This application is a continuation of my co-pending application Ser. No. 141,779, filed May 10, 1937.

Among the objects of the present invention, it is aimed to provide an improved vehicle, such as an airplane suitable to be converted from day passenger use to night passenger use which is characterized by having at least a double row of chairs along a longitudinal wall of the vehicle which can be arranged for day use into adjacent forwardly or rearwardly facing chairs and arranged for night use in two longitudinally extending rows of berths, the berths of one row being staggered relative to the berths of the other row.

It is still another object of the present invention to provide a vehicle, such as an airplane suitable to be converted from day passenger use to night passenger use having a double longitudinally extending row of chairs which may be disposed adjacent to one another facing either forwardly or rearwardly for day use and arranged in two longitudinally extending rows of berths of each row being spaced from one another and staggered relative to the berths of the other row.

It is still another object of the present invention to provide an improved vehicle, such as an airplane having a chamber provided with a double longitudinally extending row of chairs and an upper foldable berth, the chairs being disposed adjacent to one another facing either rearwardly or forwardly and the upper berths folded out of the way for day use and the chairs converted into two longitudinally extending rows of berths, the berths of each row being spaced from one another and staggered relative to the berths of the other row and the upper berths being spaced from one another and formed in a single row preferably above the lower berth of one row to form an increased standing space for the lower berths of the other row and preferably substantially clearing the upper space between the first mentioned lower berths.

It is still another object of the present invention to provide an improved vehicle, such as an airplane having a double row of chairs disposed along a longitudinal wall of the vehicle and a single row of berths along such longitudinal wall, the chairs being disposed adjacent to one another and adapted to face in the same direction for day use while the upper berths are folded out of use and the lower berths of each row being spaced from one another and staggered relative to the lower berths of the other row for night use to provide standing spaces between the ends thereof and the berths of the upper row preferably being disposed above the lower berths of the inner row and spaced from one another to provide an increased head room for the standing spaces of the lower berths of the outer row and the upper berths being also spaced from the longitudinal wall of the vehicle to increase the head room of the lower berths of the outer row.

It is still another object of the present invention to provide an improved vehicle such as an airplane having at least a double row of lower berths disposed along a longitudinal outer wall of the vehicle, the ends of the berths of each row of lower berths being spaced from one another and the berths of each lower row being staggered relative to the berths of the other row and a single row of upper berths disposed above the lower berths of the inner row and the ends of which are similarly spaced to provide increased head room for the standing spaces of the outer row of lower berths and the upper berths being spaced from the longitudinal outer wall of the vehicle to provide at least increased head room for the standing space of the inner row of lower berths and the lower berths and their standing space being partitioned from one another by curtains or the like and also partitioned from the upper berth and the aisle of the vehicle.

It is still another object of the present invention to provide an improved vehicle such as an airplane having a double row of longitudinally extending berths, the ends of each row of berths being spaced from one another and staggered relative to the berths of the other row and the intermediate portion of each berth being wider than the end portions thereof and extending into the spaces formed between the berths of the other row.

It is still another object of the present invention to provide an improved vehicle such as an airplane having a double longitudinally extending row of berths, the berths of each row being staggered relative to the berths of the other row and having adjacent horizontally overlapping portions, the width of each berth varying whereby the rows of berths cooperate with one another to provide a predetermined narrow and wide portion for each berth.

It is still another object of the present invention to provide an improved vehicle such as an airplane having a double longitudinally extending row of berths, the berths of each row being staggered relative to the berths of the other row and having adjacent horizontally overlapping portions, the width of each berth varying with the combined greatest width of the berths of the two rows being greater than the total width of both rows.

It is still another object of the present invention to provide an improved vehicle such as an airplane having a double longitudinally extending row of chairs, each chair having a back and a seat portion, the row of chairs being convertible into a row of berths by placing three of said portions into a longitudinal row.

It is still another object of the present invention to provide an improved vehicle such as an airplane having a double longitudinally extending row of chairs, each chair having a back and a seat portion of different dimensions, the row being convertible into a row of berths by placing a plurality of said portions into a longitudinal row with certain of said portions being placed relative to other of said portions to form berths each of which has a varying width.

These and other features, capabilities and advantages of the invention will appear from the subjoined detail description of one specific embodiment thereof illustrated in the accompanying drawings in which Figure 1 is a fragmental diagrammatic plan of my invention.

Fig. 2 is a fragmental diagrammatic longitudinal section of the same.

Fig. 3 is a section on the line A—A of Fig. 1.
Fig. 4 is a section on the line B—B of Fig. 1.
Fig. 5 is a section on the line C—C of Fig. 1.

In the embodiment shown, there is provided a structure or housing of a vehicle having two longitudinally extending outer walls 1, 2, see Fig. 1, with one double row of chairs 3, 4 arranged in seat formation for day use adjacent the wall 2 and another double row of chairs 5, 6 adjacent the wall 1 in different conditions of conversion leading up to, and actually, being converted into night use.

The double row of chairs 3, 4 and 5, 6 shown in Fig. 1 are those arranged as an instance on the base 7, see Fig. 3. Above the inner or inboard row of chairs 6 and 3, there are arranged in the present instance, two rows of upper berths 8, 9. While the walls 1 and 2 may have any desired form, in the present instance, they are shown as arcuate, see Figs. 3, 4 and 5.

Each of the chairs 3 to 6 inclusive is preferably provided with a seat portion 10 and a back portion 11 which may be operatively associated with one another in any one of a number of conventional ways so long as the way selected (1) permits positioning the back portion at one time to form a forwardly facing chair as illustrated by the two rows of chairs adjacent the wall 2 of Fig. 1 with the exception of the first pair of chairs 3 and 4 at the left, Fig. 1; (2) permits positioning the back portion at another time to the rear of the seat, see the position of the back portion 121 relative to the seat portion 122 of Fig. 1; (3) permits reclining the back portion from the vertical that shown by the back portion 121 of Figs. 1 and 2 to that shown by the backs 11 of the chairs adjacent the wall 2 of Fig. 1; and (4) permits moving or removing the back portion to position it between two adjacent seats as indicated by the position of the back portion 118 between the seat portions 119 and 120 of Fig. 1.

Since the art relating to the construction of chairs is no doubt one of the oldest arts and chairs having such movable or removable back portions have been extensively devised and used in the convertible couch bed art, in the sleeping car art, in the convertible berth couch art associated with sea-going vessels and automobiles and more recently with airplanes and trailers, it is needless at this late date to supply a specific construction of the same especially since the present invention is not directed to any particular construction of such back and seat combinations and since it is well known that so far as concerns the present invention any one of a number of well known constructions old in the art are sufficient so long as the back portion is movable or removable from its back forming position and positionable between adjacent seat portions into bed formation, that illustrated by the position of the back portion 118 between the seat portions 119 and 120 of Figs. 1 and 2. The back portion in the present instance, see Fig. 1, is shown as longer than the width of a seat 10. Preferably as shown the width of a back on the other hand substantially conforms to the space formed between two adjacent seats 10, 10 so that in the first step of conversion, see the left hand portion of Fig. 1, the back 11 is positioned between two adjacent seats 10, 10.

In day use, the chairs 3, 4 are arranged, see for instance the chairs 3, 4 so that two are disposed adjacent one another and may face in the same direction, see the rows of chairs adjacent the wall 2. For night use, see the chairs 5, 6 adjacent the wall 1, starting at the left hand end of Fig. 1, the second chair 110 is converted so that its back 11 is positioned to the left hand end of the seat 110 and the back 112 for the next seat 111 is moved or removed from its previous back forming position and then positioned in bed formation between the seats 110 and 111 transverse to its seat forming position, the next seat to the right of the seat 111, has its back 113 again moved backward as that for the seat 110 and here we have a bedding 114 positioned on the chairs and back of this berth, the mattress terminating at the point 115 to form a standing space 116 between it and the curtain 117 hereinafter to be described. The inner or inboard row of chairs 6 are positioned substantially in the following manner whereby the ends are spaced from one another and the berths formed are staggered relative to the berths formed by the outer or outboard row of chairs 5. Starting again from the left hand end of Fig. 1, the back 118 of the second chair is positioned horizontally between the seats 119 and 120 and space formed between the rear end of the seat 120 and the back 121 of the next chair 122, the seat 120 remaining adjacent to the seat 110 and a standing space formed between the seats 120 and 122 adjacent to the back portion 112. With the next berth to the right, the back 123 of the chair 124 is positioned between the seats 122 and 124 and disposed adjacent to the space 125 between the seat 111 and back 113 of the outer row.

In the next berth to the right in a further step of conversion beyond the back 126, the bedding or mattress portion 127 is positioned upon two adjacent seats and an intervening back portion concealed by the bedding 127. As will appear from Fig. 1, the curtain 117 of the next outboard berth divides or partitions on the left hand side the standing space 116 for the berth provided with the mattress 127 and the mattress 128 of the outboard berth next adjacent to the right. This curtain 117 may as here illustrated extend from the wall through the space 116 and between the space 116 and back 129 to the berth containing the mattress 127 and then between the berths defined by the mattress portions 127 and 128 to and between the standing space 130 and the mattress portion 127 and then proceed backwardly.

The curtain 117 may be secured to the wall 1 in the usual way and after passing the space 130 connected to a curtain rod 131, which curtain has a portion 132 which extends between the aisle 133 and the standing space 130 halfway and another portion 134 which extends halfway to close the inboard berth containing the mattress 127.

The next curtain 135 to the right extends from the wall 1 between the berth defined by the mattress 128 and the space 136 to and between the berths defined by the mattress portions 128 and 137 to the front of the back portion 138 and terminating in the curtain portions 139 and 140, the curtain portion 139 supplementing the curtain portion 132 to close the standing space 130 when desired and the curtain portion 149 closing and supplementing the curtain portion 141 to close the berth defined by the bedding 137.

Preferably above each inboard berth, such as those defined by the matress portions 127 and 137 are positioned the upper berths 8. In the daytime the upper berths are folded up into closed position that shown in Fig. 2. In night position, they extend down into the position shown in Fig. 3. Preferably each berth 8 is provided with a wall member 142 extending substantially parallel to the mattress portion of the lower berth above the same and then flaring upwardly into the portion 143 to form an increased headroom both for the outboard berth and the standing space adjacent thereto of an inboard berth.

From the foregoing, it will thus appear that the combination of housing, chairs, and berths here provided relates particularly to vehicles such as airplanes where the space within the interior of a housing must be conserved to the utmost without impairing any of the essential requirements of the interior whether used during the night or during the day.

Particularly with vehicle interiors such as those of airplanes where there is a scarcity of space and where consequently advantage must be taken of every particle of space available, the passage common to the several berths through the vehicle must be maintained as narrow as possible and this can be accomplished with the present invention where the aisle is not required as a dressing space for the lower berths and when each lower berth has a separate dressing or standing space, the standing spaces 116, 125 or 135, see Figs. 1 and 3 for the inboard berth defined by the mattress 127 and the standing space 130 for the outboard berth defined by the mattress 128. It is of course also obvious that the occupants of inboard berths 127 can gain access to the standing spaces when in a sitting position, as an instance by merely swinging their legs over their mattress portions 127 into their particular standing spaces 116, 125 or 135. While the upper berths may be omitted without affecting the use of the lower berths, the present invention shows how the space directly above the inboard lower berths can be utilized by the upper berths when separated from one another at their ends to clear the standing spaces 130 for the outboard lower berths without interfering with the use of the lower rows of berths and therefore shows how the space above the inboard lower berths can be used to advantage and consequently how all the space available in an airplane interior can be used to the best advantage.

It is obvious that various changes and modifications may be made to the details of construction without departing from the general spirit of the invention as set forth in the appended claims.

I claim:

1. In a vehicle cabin, the combination of a double row of longitudinally extending berths lying alongside of one another and all to the same side of an aisle, the berths of one row being staggered relative to the berths of the other row, each berth being of varying width, the maximum width of each berth of one row being alongside the minimum width of the berths of the other row.

2. In a vehicle cabin having a central aisle, rows of pairs of spaced apart chairs having relatively movable chair portions on each side of said aisle, the chair portions being convertible on each side of said aisle into a double row of lower berths spaced apart in end to end relation, the spaces between the berths of the inner row of berths and the spaces between the berths of the outer row of berths being staggered to provide individual dressing spaces, one for each said berths, the inner row of berths and outer row of berths being formed of groups of said chair portions, the chair portions of each row being selected in groups that are in staggered relation to groups of the other row to form said staggered dressing spaces.

3. In a vehicle cabin, a row of pairs of spaced apart chairs having relatively movable chair portions lying to one side of an aisle, said chair portions being convertible into a double row of lower berths spaced apart in end to end relation, the spaces between the berths of the inner row and the spaces between the berths of the outer row of said lower berths being staggered to provide individual dressing spaces, one for each said lower berth, and the berths of the inner and outer rows of berths being formed of said chair portions, the chair portions of each row being selected in groups that are in staggered relation to groups of the other row to form said staggered dressing spaces.

4. In a vehicle cabin, a double row of adjacent seats lying to one side of an aisle, the said seats being spaced apart along the length of said aisle, the inner row of said seats being convertible into lower berths spaced apart in end to end relation, the outer row of seats being convertible into lower berths spaced apart in end to end relation, the spaces between said lower berths corresponding to the alternate spaces between said seats of the inner and outer rows of seats, and the spaces of one row of berths being staggered relative to the spaces in the other row of berths to provide individual dressing spaces, one for each of said lower berths.

5. In a vehicle cabin, a double row of adjacent seats lying to one side of an aisle, the seats in each row being spaced apart in the direction of the aisle, pairs of seats of the inner row formed into spaced apart lower berths extending in the direction of the aisle, and pairs of seats of the outer row formed into spaced apart lower berths with the spaces between said latter rows of berths in staggered relation to the spaces between said first row of berths to form staggered rows of individual dressing spaces, one dressing space for each said lower berth.

6. In a vehicle cabin, a longitudinally extending row of spaced apart berths, a second row of longitudinally extending spaced apart berths adjacent the first said row of berths, the said two adjacent rows of berths being staggered in their spaced relationship with the spaces between the berths of the inner row and the spaces between the berths of the outer row forming individual dressing spaces, one dressing space for each said berth, all of said berths lying to one side of an aisle in said cabin, and removable partitioning means defining each berth and its dressing space.

7. In a vehicle cabin, the combination of a longitudinally extending double row of spaced chairs usable for day and having movable back portions, the said double row of chairs all being positioned to one side of an aisle in said cabin, the movable back portion of one chair filling the space between two successive chairs in a row to form a berth, the berths of one row being staggered relative to the berths of the other row, and a row of upper berths disposed above one row of lower berths in spaced apart relation with the spaces between the upper berths aligning with and above the spaces between the said row of lower berths to provide standing spaces for the other row of said lower berths.

8. In a vehicle cabin, the combination of a longitudinally extending double row of spaced chairs usable for day use, each of said chairs comprising a seat portion and a back portion movable relative one to the other, the said double row of chairs all being positioned on one side of an aisle in said cabin, the movable back portions of alternate chairs of the outer row of chairs together with two adjacent seat portions of said outer row forming a row of spaced apart outer lower berths, and the movable back portions of alternate chairs of the inner row of chairs adjacent to chairs intermediate said alternate chairs of said outer row together with two adjacent seat portions of said inner row forming a row of spaced apart inner lower berths with the spaces between successive berths of each row forming individual dressing spaces for the berths of the other row.

9. In a vehicle cabin, the combination of a longitudinally extending double row of inner and outer chairs spaced longitudinally of the cabin and positioned upon one side of an aisle in said cabin, said chairs comprising relatively movable seat and back portions, said movable back portions positioned into the space between adjacent seat portions and having a greater width than the seat portions to extend into the space between adjacent seat portions of the other row to form spaced apart longitudinally extending berths in one row in staggered relationship to the berths in the other row with the intermediate portion of greater width of each berth in one row extending into the space between the berths of the other row.

10. In a vehicle cabin, the combination of a double row of spaced apart longitudinally extending berths lying alongside of one another and to one side of an aisle in said cabin, the spaces between the berths forming dressing spaces, one for each berth, the berths of each row being staggered with relation to the berths of the other row, an intermediate portion of each berth of a row extending a substantial distance alongside of a portion of the space between the berths of the other row, the dressing spaces between the berths of the row nearest the aisle forming access from said aisle to the berths of the other row.

11. In a vehicle cabin, the combination of a double row of spaced apart longitudinally extending lower berths lying to one side of an aisle in said cabin, the lower berths of each row being staggered with relation to the lower berths of the other row, an intermediate portion of each berth of a row extending a substantial distance alongside of a portion of the space between the lower berths of the other row, and a row of spaced apart upper berths disposed above one row of lower berths, the spaces between the upper berths being aligned with the spaces between the said latter row of lower berths to provide standing spaces for said other row of lower berths.

12. In a vehicle cabin, the combination of partitions defining a longitudinally extending double row of spaced apart berth spaces positioned alongside of one another to one side of an aisle in said cabin, the berth spaces of each row being staggered relative to the berth spaces of the other row so that the spaces between the berth spaces of each row are each positioned between the ends of a berth space of the other row to form individual dressing spaces for each row of berth spaces, the dressing spaces between the berths of the row nearest the aisle forming access from said aisle to the berths of the other row, said partitions defining said berth spaces including their respective dressing spaces from the other berth spaces and from said aisle.

13. In a vehicle cabin, the combination of a double row of spaced apart longitudinally extending lower berths positioned to one side of an aisle in said cabin, the lower berths of one row being staggered with relation to the berths of the other row, and having portions of the lower berths of the inner row overlapping portions of the berths of the outer row, the spaces between said berths constituting dressing spaces between the ends of said lower berths, and removable partitioning means defining each berth and its dressing space.

14. In a vehicle cabin, the combination of a double row of spaced apart longitudinally extending lower berths positioned to one side of an aisle in said cabin, the lower berths of one row being staggered with relation to the berths of the other row, and portions of a lower berth of one row overlapping portions of two lower berths of the other row, the spaces between said berths constituting individual berth dressing spaces between the ends of said lower berths, one dressing space for each berth, the dressing spaces between the berths of the row nearest the aisle forming access from the aisle to the side portion of the berth of the other row.

15. In a vehicle cabin, the combination of a double row of spaced apart longitudinally extending berths lying alongside of one another to one side of an aisle in said cabin, the berths of each row being staggered with relation to the berths of the other row, and the berths of each row having a maximum width greater than one-half the width of the double row of berths extending into the space between the ends of the berths of the other row.

16. In a vehicle cabin, the combination of a double row of spaced apart longitudinally extending berths lying alongside of one another and to one side of an aisle in said cabin, the berths of each row being staggered with relation to the berths of the other row, each berth of each row overlapping at its end portions the end portions of two berths of the other row to form dressing spaces between the ends of said spaced apart berths with each dressing space disposed at a point substantially midway between the lengths of a berth of the other row affording access to the berths from said dressing spaces at the central portion of each berth.

17. In a vehicle cabin, the combination of a longitudinally extending double row of inner and outer spaced chairs positioned upon one side of and aisle in said cabin, the chairs comprising relatively movable back and seat portions, one of said back portions positioned in the space between two adjacent chairs to form therewith a berth, the other back portion being retained in position to form an end board for said berth, the respective back portions of one row being staggered relative to the respective back portions of the other row to form spaced apart longitudinally extending berths in one row in staggered relationship to that of the other row, and individual dressing spaces for said berths.

18. In a vehicle cabin, the combination of a double row of longitudinally extending berths lying alongside of one another and all to the same side of an aisle, the berths of one row being staggered to position a portion of each berth between the ends of the berths of the other row, each berth being of varying width, and the maximum width of each berth being greater than one-half the width of the double row of berths.

19. In an aeroplane cabin, the combination of a double row of lower berths disposed to one side of an aisle, a row of upper berths disposed to the same side of the aisle and above the inboard row of lower berths, said upper berths and inboard row of lower berths being spaced apart longitudinally, the spaces between the upper berths and the spaces between the lower berths of the inboard row being in substantial vertical alignment to provide access to the outboard row of berths from the aisle.

20. The combination of a double row of longitudinally extending lower berths disposed to one side of an aisle, the berths of the inboard row being spaced apart to form standing spaces to afford access from the aisle to the berths of the outboard row, and removable partitioning means enclosing each of said standing spaces from the opposing ends of the two adjacent berths of the inboard row.

21. The combination of an outboard row of longitudinally extending lower berths, an inboard row of longitudinally extending lower berths disposed between an aisle and said outboard row of berths, the berths of the inboard row being spaced apart to form standing spaces, one between the ends of each two successive berths of the inboard row adjacent to a berth of the outboard row, and removable partitioning means enclosing each outboard berth and its standing space from inboard berths forming a private access to each outboard berth from the aisle.

22. A sleeping coach arrangement comprising a double row of seats, having backs, along each side of the coach spaced to provide an aisle longitudinally of the coach therebetween, each seat in either row on a side of the aisle being so constructed and arranged as to permit the back rest thereof in diagonally opposite seats to be positioned horizontally between the seat portion of a pair of adjacent seats in a row whereby a pair of berths may be constructed in each row adjacent each other on a side of the aisle in staggered relation one with another and removable partitioning means extending to said aisle and inclosing each said berth whereby access may be had directly from the aisle to each said berth.

23. In passenger accommodations for aircraft, a compartment comprising: an enclosing member comprising a removable curtain wall cooperating with the side wall of the aircraft having pairs of single chairs spaced along said side wall of a normally open passenger cabin, an L-shaped enclosure having three single chairs therein, two of said chairs being in longitudinally adjacent relation and cooperating to form a berth, the third chair being disposed in side-by-side relation to another of said chairs.

24. In a vehicle cabin, the combination of an outboard row and an inboard row of longitudinally extending berths disposed to one side of an aisle, a row of upper berths disposed above said inboard berths, said upper berths and inboard berths being spaced apart longitudinally, the spaces between the upper berths and the spaces between the inboard berths being in substantial vertical alinement to provide passageways through said rows of inboard and upper berths whereby each outboard berth is afforded independent access with said aisle.

25. In a vehicle cabin, the combination of an outboard row and an inboard row of longitudinally extending berths disposed to one side of an aisle, a row of upper berths disposed above said inboard berths, said upper berths and inboard berths being spaced apart longitudinally, the spaces between the upper berths and the spaces between the inboard berths being in substantial vertical alinement to provide passageways through said rows of inboard and upper berths whereby each outboard berth is afforded independent access with said aisle, and partitioning means enclosing each outboard berth including its respective passage-way from the inboard and upper berths and from the aisle whereby each passage-way forms a private dressing space for its respective berth.

TRIMBLE DE ROODE.